US008832090B2

(12) United States Patent
Sugaya

(10) Patent No.: US 8,832,090 B2
(45) Date of Patent: Sep. 9, 2014

(54) INFORMATION PROCESSING DEVICE, METHOD AND SERVER FOR DETERMINING TYPE OF ELECTRIC APPLIANCE

(75) Inventor: Shunji Sugaya, Tokyo (JP)

(73) Assignee: Optim Corporation, Saga-Shi, Saga (JP)

( * ) Notice: Subject to any disclaimer, the term of this patent is extended or adjusted under 35 U.S.C. 154(b) by 71 days.

(21) Appl. No.: 13/618,279

(22) Filed: Sep. 14, 2012

(65) Prior Publication Data

US 2013/0013594 A1 Jan. 10, 2013

Related U.S. Application Data

(63) Continuation of application No. 12/680,334, filed as application No. PCT/JP2009/004750 on Sep. 18, 2009, now Pat. No. 8,301,625.

(30) Foreign Application Priority Data

Sep. 22, 2008 (JP) ................... 2008-243170

(51) Int. Cl.
*G06F 17/30* (2006.01)
*H04L 29/08* (2006.01)
*H04L 12/28* (2006.01)

(52) U.S. Cl.
CPC ....... *H04L 12/2809* (2013.01); *H04L 2012/285* (2013.01); *H04L 12/2807* (2013.01); *H04L 67/34* (2013.01); *H04L 2012/2849* (2013.01)
USPC ........................................................ 707/723

(58) Field of Classification Search
USPC ........................................................ 707/723
See application file for complete search history.

(56) References Cited

U.S. PATENT DOCUMENTS

| 7,610,380 | B2 | 10/2009 | Igarashi et al. |
| 7,769,990 | B1 * | 8/2010 | Okcu et al. ................ 713/1 |
| 7,779,026 | B2 | 8/2010 | Faulkner et al. |
| 7,853,662 | B2 * | 12/2010 | Ha et al. ................ 709/208 |
| 7,873,699 | B2 * | 1/2011 | Ha et al. ................ 709/208 |

(Continued)

FOREIGN PATENT DOCUMENTS

| JP | 2003101566 A | 4/2003 |
| JP | 2003259569 A | 9/2003 |

(Continued)

OTHER PUBLICATIONS

International Search Report, mail date Dec. 28, 2009, in corresponding International Application No. PCT/JP2009/004750.

(Continued)

*Primary Examiner* — Sheree Brown
(74) *Attorney, Agent, or Firm* — Hoffmann & Baron, LLP

(57) ABSTRACT

A device, a method and a server for performing device identification of electric appliances connected to a network are provided. An information processing device, to which electric appliances are communicably connected via a network, receives a packet (a response packet and/or a passive packet) for determining a type of an electric appliance, from the electric appliances. The information processing device stores definition files defined for each electric appliance in advance, compares the received packet with the definition files for the each electric appliance, scores the packet, extracts a definition file with a high score, and determines electric appliance information of the extracted definition file as electric appliance information of the electric appliance.

14 Claims, 10 Drawing Sheets

(56) References Cited

U.S. PATENT DOCUMENTS

| | | | |
|---|---|---|---|
| 7,886,185 B1* | 2/2011 | Okcu et al. | 719/328 |
| 7,917,663 B2* | 3/2011 | Choi et al. | 710/10 |
| 7,958,170 B2 | 6/2011 | Faulkner et al. | |
| 8,132,186 B1* | 3/2012 | Okcu et al. | 719/321 |
| 8,301,625 B2* | 10/2012 | Sugaya | 707/723 |
| 8,510,737 B2* | 8/2013 | Kunjithapatham et al. | 718/100 |
| 8,626,907 B2* | 1/2014 | Sugaya | 709/224 |
| 2004/0158333 A1* | 8/2004 | Ha et al. | 700/3 |
| 2004/0249903 A1* | 12/2004 | Ha et al. | 709/208 |
| 2005/0149642 A1* | 7/2005 | Choi et al. | 710/15 |
| 2006/0089987 A1 | 4/2006 | Igarashi et al. | |
| 2006/0156307 A1* | 7/2006 | Kunjithapatham et al. | 718/103 |
| 2008/0026725 A1* | 1/2008 | Cha | 455/411 |
| 2008/0243684 A1* | 10/2008 | Ng et al. | 705/39 |
| 2011/0138058 A1* | 6/2011 | Ishida | 709/227 |
| 2011/0302201 A1* | 12/2011 | Ogaz et al. | 707/769 |

FOREIGN PATENT DOCUMENTS

| | | |
|---|---|---|
| JP | 2004510254 A | 4/2004 |
| JP | 2006295513 A | 10/2006 |
| JP | 2007199820 A | 9/2007 |
| JP | 2007305145 A | 11/2007 |
| WO | 2006095593 A1 | 9/2006 |

OTHER PUBLICATIONS

Notice of Reasons for Rejection issued to JP Application No. 2009-130552, mailed Feb. 8, 2011.

Identifying Maker of Equipment by Investigating IP Address and MAC Address, No. 63, pp. 114-117, 2005.

* cited by examiner

FIG. 4

MAC ADDRESS

04-A3-43-5F-43-23

HIGH-ORDER 24 BITS  8BITS

FIG. 5

MAC ADDRESS/MANUFACTURER TABLE

| ID | HIGH-ORDER 24 BITS | MANUFACTURER | POINTS |
|---|---|---|---|
| 001 | 04-A3-43 | COMPANY A | 0.3 |
| 002 | 02-01-50 | COMPANY B | 0.3 |
| ⋮ | ⋮ | ⋮ | ⋮ |

FIG. 6

MAC ADDRESS/DEVICE MODEL TABLE

| ID | 8BITS | DEVICE MODEL | POINTS |
|---|---|---|---|
| 010 | 5F | AB-01 | 0.3 |
| ⋮ | ⋮ | ⋮ | ⋮ |

FIG. 7

PORT NUMBER

| TCP | 5000 | 5001 | 5002 |
|---|---|---|---|
| BIND | ○ | × | ○ |

FIG. 8

PORT NUMBER TABLE

| ID | MANUFACTURER | MODEL NAME | 5000 | 5001 | 5002 | POINTS |
|---|---|---|---|---|---|---|
| 100 | COMPANY A | AB-01 | ○ | × | ○ | 0.2 |
| 101 | COMPANY A | AB-02 | × | ○ | × | 0.2 |
| ⋮ | ⋮ | ⋮ | ⋮ | ⋮ | ⋮ | ⋮ |

FIG. 13

HOME NETWORK MANAGEMENT TABLE

| HOME NETWORK ID | ELECTRIC APPLIANCE |
|---|---|
| 500 | AB-01 |
| | DE-02 |
| | PC-01 |
| 501 | OA-01 |
| | TE-02 |

INFORMATION PROCESSING DEVICE, METHOD AND SERVER FOR DETERMINING TYPE OF ELECTRIC APPLIANCE

CROSS-REFERENCE TO RELATED APPLICATIONS

This application is a continuation application of, and claims priority to, co-pending U.S. Ser. No. 12/680,334, filed on Mar. 26, 2010 as a national phase application of International Application No. PCT/JP 2009004750, filed Sep. 18, 2009, which in turn claims the benefit of priority to JP 2008-243170, filed Sep. 22, 2008, each of which is incorporated herein in its entirety by reference thereto.

TECHNICAL FIELD

The present invention relates to an information processing device, a method and a server for determining a type of an electric appliance.

BACKGROUND ART

In recent years, not only a computer and a telephone, but also household electric appliances in general such as a digital television, refrigerator, telephone and washing machine are becoming applicable as electric appliances that are connected to a home network.

Furthermore, due to the recent advances in IT, the absolute number of electric appliances used at home is increasing, and it is becoming difficult for a user to perform precise management of all household electric appliances.

In such circumstances, a method has been disclosed in which household electric appliances at home are managed by subscribing to a support service via the Internet (for example, Patent Document 1).

PRIOR ART DOCUMENT

Patent Document

Patent Document 1: Japanese Unexamined Patent Application, No. 2007-305145

SUMMARY OF THE INVENTION

Problems to be Solved by the Invention

However, in the method according to Patent Document 1, it is required to subscribe to a support service via the Internet, and it is not easy for the user to manage electric appliances while preventing other people from learning information on the electric appliances owned by the user.

Moreover, even if a support service is utilized, in a case in which the user purchases a new electric appliance, it may be required to register the purchased electric appliance to the support service in some cases, and the user has to wait for communication from the support service; therefore, the management cannot be performed on the initiative of the user.

An objective of the present invention is to provide an information processing device, a method and a server for performing identification of electric appliances connected to a network.

Means for Solving the Problems

The present invention provides solutions as described below.

(1) An information processing device to which electric appliances are communicably connected, comprising: means for transmitting a request packet that transmits a predetermined request packet to an electric appliance; means for receiving a response packet based on which the identification of a type is performed for the electric appliance from the electric appliance to which the predetermined request packet has been transmitted; means for storing that stores a definition file prepared for each of the electric appliances; means for scoring that compares the response packet with the definition file prepared for each of the electric appliances so as to perform scoring for the definition file; and means for determining a type of an electric appliance that extracts a definition file having a high score provided by the means for scoring and determines the information related to a particular electric appliance contained in the extracted definition file as corresponding to the electric appliance.

According to aspect (1) of the invention, the information processing device transmits the predetermined request packet to the electric appliance, receives the response packet, based on which the identification of the type of the electric appliance is performed, from the electric appliance to which the request packet has been transmitted, compares the definition file stored beforehand with the response packet, and performs scoring. Subsequently, the information processing device extracts the definition file having the high score and determines the type of the electric appliance by selecting the information related to the particular electric appliance contained in the extracted definition file as corresponding to the electric appliance.

Accordingly, aspect (1) of the invention allows the type (e.g., the unit name specifying the kind of the electric appliance) of the communicably connected electric appliance to be specified automatically without the participation of a user.

(2) The information processing device according to aspect (1) of the invention, wherein the means for transmitting a request packet and the means for receiving a response packet perform transmission and reception of a plurality of packets between the electric appliance and the information processing device, and the means for determining a type of an electric appliance extracts the definition file having the high score based on a total score associated with the plurality of packets.

According to aspect (2) of the invention, since the type of the electric appliance (the information related to the electric appliance) is specified based on the total score associated with the plurality of packets, it is possible to gradually increase the accuracy of the information related to the electric appliance in addition to the invention (1). For example, if the unit name is unknown for the electric appliance, it is possible to gradually specify the information related to the electric appliance as far as the manufacturer name.

(3) The information processing device according to aspect (1) or (2) of the invention, wherein the means for scoring compares the response packet with the definition file prepared for each of the electric appliances and performs scoring according to the amount of similarity between the response packet and the definition file.

According to aspect (3) of the invention, it is possible to specify the unit name for the electric appliance to some extent although the response packet does not fully agree with the definition file. The reason for this is that scoring is performed based on the amount of the similarity between the response packet and the definition file. For example, it is possible to specify the information related to an electric appliance based on the amount of similarity for a new electric appliance that does not have a corresponding definition file, while using a definition file provided for an existing product.

(4) The information processing device according to any one of aspects (1) to (3) of the invention, wherein the means for transmitting a request packet transmits the request packet to the electric appliance at regular intervals so as to detect the electric appliance communicably connected to the information processing device at predetermined timing.

According to aspect (4) of the invention, the information processing device transmits the request packet to the electric appliance at regular intervals. When a user connects a new electric appliance to the information processing device, the new electric appliance that receives the transmitted request packet can be automatically detected. In this manner, it is easy for the user to manage the electric appliance, since the information related to the electric appliance will be available only if the user connects the electric appliance to a network.

(5) A method performed by an information processing device to which electric appliances are communicably connected, the method comprising the steps of: transmitting a predetermined request packet to an electric appliance; receiving a response packet, based on which the identification of a type is performed for the electric appliance, from the electric appliance to which the predetermined request packet has been transmitted; storing a definition file prepared for each of the electric appliances; scoring by comparing the response packet with the definition file prepared for each of the electric appliances; and extracting a definition file having a high score provided at the previous step of scoring and determining the information related to a particular electric appliance contained in the extracted definition file as corresponding to the electric appliance.

According to aspect (5) of the invention, the information processing device transmits the predetermined request packet to the electrical appliance, receives the response packet based on which the identification of the type is performed for the electric appliance to which the request packet has been transmitted, compares the definition file stored beforehand with the response packet, and performs scoring. Subsequently, the information processing device extracts the definition file having the high score and determines the type of the electric appliance by selecting the information related to the particular electric appliance contained in the extracted definition file as corresponding to the electric appliance.

Accordingly, aspect (5) of the invention allows the type (e.g., the unit name specifying the electric appliance) of the communicably connected electric appliance to be specified automatically without the participation of a user.

(6) The method according to aspect (5) of the invention, wherein the transmitting a predetermined request packet and the receiving a response packet perform transmission and reception of a plurality of packets between the electric appliance and the information processing device, and the determining a type of an electric appliance extracts the definition file having the high score based on a total score associated with the plurality of packets.

According to aspect (6) of the invention, since the type of the electric appliance (the information related to the electric appliance) is specified based on the total score associated with the plurality of packets, it is possible to gradually increase the accuracy of the information related to the electric appliance in addition to aspect (5) of the invention. For example, if the unit name is unknown for the electric appliance, it is possible to gradually specify the information related to the electric appliance as far as the manufacturer name.

(7) The method according to aspect (5) or (6) of the invention, wherein the scoring compares the response packet with the definition file prepared for each of the electric appliances and performs scoring according to an amount of similarity between the response packet and the definition file.

According to aspect (7) of the invention, it is possible to specify the unit name for the electric appliance to some extent although the response packet does not fully agree with the definition file. The reason for this is that scoring is performed based on the amount of the similarity between the response packet and the definition file. For example, it is possible to specify the information related to an electric appliance based on the similarity for a new electric appliance that does not have a corresponding definition file, while using a definition file for an existing product.

(8) The method according to anyone of aspects (5) to (7) of the invention, wherein the transmitting a request packet transmits the request packet to the electric appliance at regular intervals so as to detect the electric appliance communicably connected to the information processing device at predetermined timing.

According to aspect (8) of the invention, the information processing device transmits the request packet to the electric appliance at regular intervals. When a user connects a new electric appliance to the information processing device, the new electric appliance that receives the transmitted request packet can be automatically detected. In this manner, it is easy for the user to manage the electric appliance, since the information related to the electric appliance will be available only if the user connects the electric appliance to a network.

(9) A system for determining a type of an electric appliance comprising: an information processing device to which electric appliances are communicably connected; and a unit recognition server communicably connected with the information processing device, the information processing device comprising: means for receiving a packet that receives from an electric appliance a packet based on which the identification of a type is performed for the electric appliance; means for requesting the information related to a type that requests the information related to a type of the electric appliance by transmitting the packet to the unit recognition server, the unit recognition server comprising: means for storing that stores a definition file prepared for each of the electric appliances; means for scoring that compares the packet with the definition file prepared for each of the electric appliances and performs scoring for the definition file in response to a request from the information processing device; and means for determining a type of an electric appliance that extracts a definition file having a high score provided by the means for scoring and transmits the information related to a particular electric appliance contained in the extracted definition file to the information processing device, while determining the information as corresponding to the electric appliance.

According to aspect (9) of the invention the information processing device receives from the electric appliance the packet based on which the identification of the type of the electric appliance is performed and requests the information related to the type of the electric appliance by transmitting the received packet to the unit recognition server. The unit recognition server compares the packet with the definition file for each of the electric alliances in response to the request from the information processing device, extracts the definition file having the high score, and transmits the information related to the particular electric appliance contained in the extracted definition file to the information processing device, while determining the information as corresponding to the electric appliance.

According to aspect (9) of the invention, it is possible to automatically specify the type (the unit name specifying the kind of the electric appliance) for the communicably connected electric appliance without the participation of a user. Different from the invention (1), it is not necessary to update the definition file in the information processing device if the definition file is updated, since the unit recognition server determines the information related to the electric appliance. It is only necessary to update the database in the unit recognition server. Accordingly, it is possible to centralize the management of the information for determining the type of the electric appliance. Since the definition file is updated each time the type of the electric appliance increases, the centralization remarkably increases convenience of the user.

(10) A unit recognition server communicably connected with an information processing device to which electric appliances are communicably connected, comprising: means for receiving that receives from the information processing device a predetermined packet that is transmitted by an electric appliance; means for storing that stores a definition file prepared for each of the electric appliances; means for scoring that compares the predetermined packet with the definition file prepared for each of the electric appliances and performs scoring for the definition file in response to a request from the information processing device; and means for determining a type of an electric appliance that extracts a definition file having a high score provided by the means for scoring and transmits the information related to a particular electric appliance contained in the extracted definition file to the information processing device, while determining the information as corresponding to the electric appliance.

According to aspect (10) of the invention, it is possible to automatically specify the type (the unit name specifying the kind of the electric appliance) for the communicably connected electric appliance without the participation of a user. Different from the invention (1), it is not necessary to update the definition file in the information processing device if the definition file is updated, since the unit recognition server determines the information related to the electric appliance. It is only necessary to update the database in the unit recognition server. Accordingly, it is possible to centralize the management of the information for determining the type of the electric appliance. Since the definition file is updated each time the type of the electric appliance increases, the centralization remarkably increases convenience of the user.

(11) A method performed by a system comprising an information processing device to which electric appliances are communicably connected and a unit recognition server communicably connected with the information processing device, the information processing device executing the steps of: receiving from an electric appliance a packet based on which the identification of a type is performed for the electric appliance; requesting the information related to the type of the electric appliance by transmitting the packet to the unit recognition server, the unit recognition server performing the steps of: storing a definition file prepared for each of the electric appliances; scoring by comparing the packet with the definition file prepared for each of the electric appliances so as to perform scoring for the definition file in response to a request from the information processing device; and extracting a definition file having a high score provided at the previous step of scoring and transmitting the information related to a particular electric appliance contained in the extracted definition file to the information processing device, while determining the information as corresponding to the electric appliance.

According to aspect (11) of the invention, it is possible to automatically specify the type (the unit name specifying the kind of the electric appliance) for the communicably connected electric appliance without the participation of a user. Different from the invention (1), it is not necessary to update the definition file in the information processing device if the definition file is updated, since the unit recognition server determines the information related to the electric appliance. It is only necessary to update the database in the unit recognition server. Accordingly, it is possible to centralize the management of the information for determining the type of the electric appliance. Since the definition file is updated each time the type of the electric appliance increases, the centralization remarkably increases convenience of the user.

(12) An information processing device to which electric appliances are communicably connected, comprising: means for receiving a packet that receives from an electric appliance a broadcast packet or multicast packet based on which the identification of a type is performed for the electric appliance; means for storing that stores a definition file prepared for each of the electric appliances; means for scoring that compares the packet with the definition file prepared for each of the electric appliances and performs scoring for the definition file; and means for determining a type of an electric appliance that extracts a definition file having a high score provided by the means for scoring and determines the information related to a particular electric appliance contained in the extracted definition file as corresponding to the electric appliance.

According to aspect (12) of the invention, the information processing device receives the broadcast packet or multicast packet from the electric appliance, compares the definition file stored beforehand with the received packet, and performs scoring. The information processing device extracts the definition file having the high score and determines the type of the electric appliance by selecting the information related to a particular electric appliance contained in the extracted definition file as corresponding to the electric appliance. Different from the invention (1), it is possible for the information processing device to determine the type of the electric appliance with the passive packet such as the broadcast packet or multicast packet without transmitting the request packet.

(13) A method performed by an information processing device to which electric appliances are communicably connected, the method comprising the steps of: receiving from an electric appliance a broadcast packet or multicast packet based on which the identification of a type is performed for the electric appliance; storing a definition file prepared for each of the electric appliances; scoring by comparing the packet with the definition file prepared for each of the electric appliances so as to perform scoring for the definition file; and extracting a definition file having a high score provided at the previous step of scoring and determining the information related to a particular electric appliance contained in the extracted definition file as corresponding to the electric appliance.

According to aspect (13) of the invention, the information processing device receives the broadcast packet or multicast packet from the electric appliance, compares the definition file stored beforehand with the received packet, and performs scoring. The information processing device extracts the definition file having the high score and determines the type of the electric appliance by selecting the information related to the particular electric appliance contained in the extracted definition file as corresponding to the electric appliance. Different from the invention (1), it is possible for the information processing device to determine the type of the electric appliance with the passive packet such as the broadcast packet or multicast packet without transmitting the request packet.

(14) A unit recognition server communicably connected with an information processing device to which electric appliances are communicably connected, comprising: means for receiving a packet that receives from the information processing device a broadcast packet or multicast packet received from the electric appliance, based on which the identification of a type is performed for an electric appliance; means for storing that stores a definition file prepared for each of the electric appliances; means for scoring that compares the packet with the definition file prepared for each of the electric appliances and performs scoring for the definition file in response to a request from the information processing device; and means for determining a type of an electric appliance that extracts a definition file having a high score provided by the means for scoring and transmits the information related to a particular electric appliance contained in the extracted definition file to the information processing appliance, while determining the information as corresponding to the electric appliance.

According to aspect (14) of the invention, it is possible to automatically specify the type (the unit name specifying the kind of the electric appliance) for the communicably connected electric appliance without the participation of a user. Different from the invention (12), it is not necessary to update the definition file in the information processing device if the definition file is updated, since the unit recognition server determines the information related to the electric appliance. It is only necessary to update the database in the unit recognition server. Accordingly, it is possible to centralize the management of the information for determining the type of the electric appliance. Since the definition file is updated each time the type of the electric appliance increases, the centralization remarkably increases convenience of the user.

In various additional aspects of the invention, the received data packet further contains at least one passive packet for determining a type of the electric appliance.

In one such aspect of the invention, an information processing device to which an electric appliance is communicably connected, includes a means for receiving a data packet that receives the data packet from an electric appliance, where the received data packet contains information for determining a type of the electric appliance, and further contains at least one passive packet. The information processing device further includes a means for storing a definition file corresponding to each of a plurality of types of electric appliances, wherein each definition file contains defining data based on at least two kinds of data packets. The means for storing also stores a score associated with each of the at least two kinds of data packets for each definition file. The information processing device further includes a means for scoring that compares the received data packet with each of the at least two kinds of data packets contained in each definition file, so as to perform scoring for each definition file based on the stored scores associated with each of the at least two kinds of data packets. Also included is a means for determining a type of an electric appliance that extracts a stored definition file having a highest score provided by the means for scoring and determines from the defining data of the extracted definition file the type of the electric appliance from which the means for receiving received the data packet.

In still another aspect, a system for determining a type of an electric appliance comprises: an information processing device to which electric appliances are communicably connected; and a unit recognition server communicably connected with the information processing device. The information processing device comprises: a means for receiving a data packet from an electric appliance from which a type of the electric appliance is determined, the received data packet containing information for determining the type of the electric appliance and further containing at least one passive packet. The information processing device also comprises a means for requesting a determination of the type of the electric appliance by transmitting the received data packet to the unit recognition server. The unit recognition server comprises a means for storing a definition file corresponding to each of a plurality of types of electric appliances, wherein each definition file contains defining data based on at least two kinds of data packets. The means for storing also stores a score associated with each of the at least two kinds of data packets for each definition file. The unit recognition server also includes a means for scoring that compares the received data packet with each of the at least two kinds of data packets contained in each definition file and performs scoring for each definition file based on the stored scores associated with each of the at least two kinds of data packets in response to a request from the information processing device; and a means for determining a type of an electric appliance that extracts a stored definition file having a highest score provided by the means for scoring and determines from the defining data of the extracted definition file the type of the electric appliance from which the means for receiving received the data packet and transmits the determination of the type of the electric appliance to the information processing device.

In yet another aspect, a unit recognition server, communicably connected with an information processing device to which electric appliances are communicably connected, comprises a means for receiving a data packet that receives from the information processing device a data packet that is transmitted by an electric appliance from which a type of the electric appliance is determined. The received data packet contains information for determining the type of the electric appliance and further contains at least one passive packet. The unit recognition server also comprises: a means for storing a definition file corresponding to each of a plurality of types of electric appliances, wherein each definition file contains defining data based on at least two kinds of data packets, and that also stores a score associated with each of the at least two kinds of data packets for each definition file; a means for scoring that compares the received data packet with each of the at least two kinds of data packets contained in each definition file and performs scoring for each definition file based on the stored scores associated with each of the at least two kinds of data packets in response to a request from the information processing device; and a means for determining a type of an electric appliance that extracts a stored definition file having a highest score provided by the means for scoring and determines from the defining data of the extracted definition file the type of the electric appliance from which the data packet was transmitted to the means for receiving and transmits the defining data for the type of the electric appliance to the information processing device.

In another aspect of the invention, a computer-implemented method for controlling an information processing device, or for controlling a system comprising an information processing device to which electric appliances are communicably connected and a unit recognition server communicably connected with the information processing device and having a processor associated therewith. The method comprises the steps of: receiving from an electric appliance a data packet for processing by the information processing device, the received data packet at least containing a packet for checking the status of use of a communications port of the electric appliance; requesting a determination of the type of the electric appliance by transmitting the received data packet from the information processing device to the unit recognition server; storing a definition file corresponding to each of a plurality of types of electric appliances for access by the unit recognition server, wherein each definition file contains defining data based on at least two kinds of data packets, and storing a score associated with each of the at least two kinds of data packets for each definition file; scoring by comparing the received data packet with each of the at least two kinds of data packets for each definition file so as to perform scoring for each definition file based on each of the at least two kinds of data packets in response to a request from the information processing device, wherein the scoring is implemented by the processor; and extracting a stored definition file having a highest score provided at the previous step of scoring and determining from the defining data of the extracted definition file the type of the electric appliance from which the received data packet is received and transmitting the determination of the type of the electric appliance from the unit recognition server to the information processing device, wherein the extracting and determining are implemented by the processor.

Effects of the Invention

According to the invention of the present application, an information processing device, a method and a server for performing identification of electric appliances connected to a network are provided. Furthermore, the communicably connected electric appliances are automatically detected, and device information on the electric appliances is scored (scoring is performed), thereby enabling step-wise identification.

BRIEF DESCRIPTION OF THE DRAWINGS

FIG. 4 is a diagram showing an example of a MAC address;
FIG. 5 is a diagram showing an example of a MAC address manufacturer table;
FIG. 6 is a diagram showing an example of a MAC address device model table;
FIG. 7 is a diagram showing an example of port numbers;
FIG. 8 is a diagram showing an example of a port number table;
FIG. 13 is a diagram showing an example of a home network management table according to the second embodiment.

Figure 1:
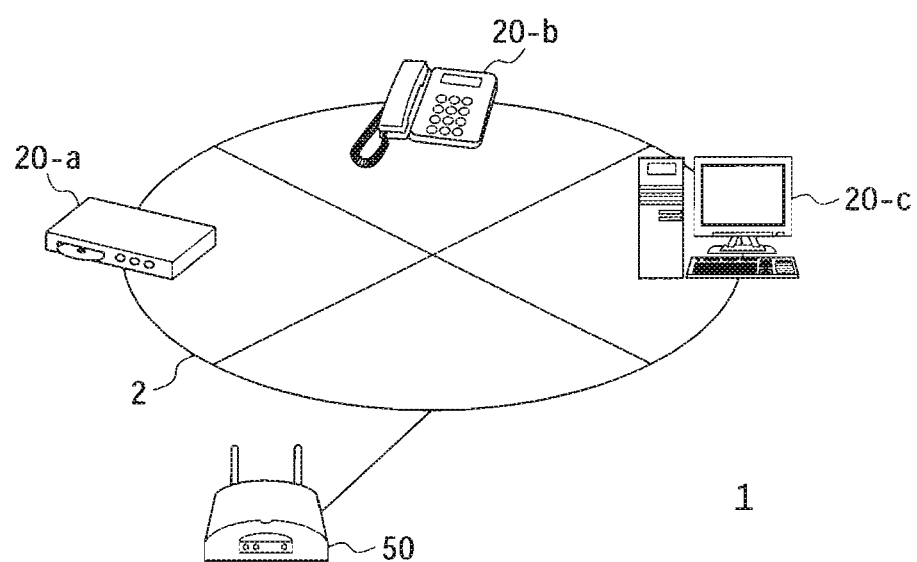
FIG. 1 is a diagram showing an overall configuration of a network system 1.

EXPLANATION OF REFERENCE NUMERALS 1 network system
5 system for determining a type of an electric appliance
20 electric appliance
50 information processing device
51 means for transmitting a request packet
52 means for receiving a response packet
53 means for storing a definition file
54 scoring means
55 means for determining a type of an electric appliance
500 device recognition server

DETAILED DESCRIPTION OF THE INVENTION

Figure 2:
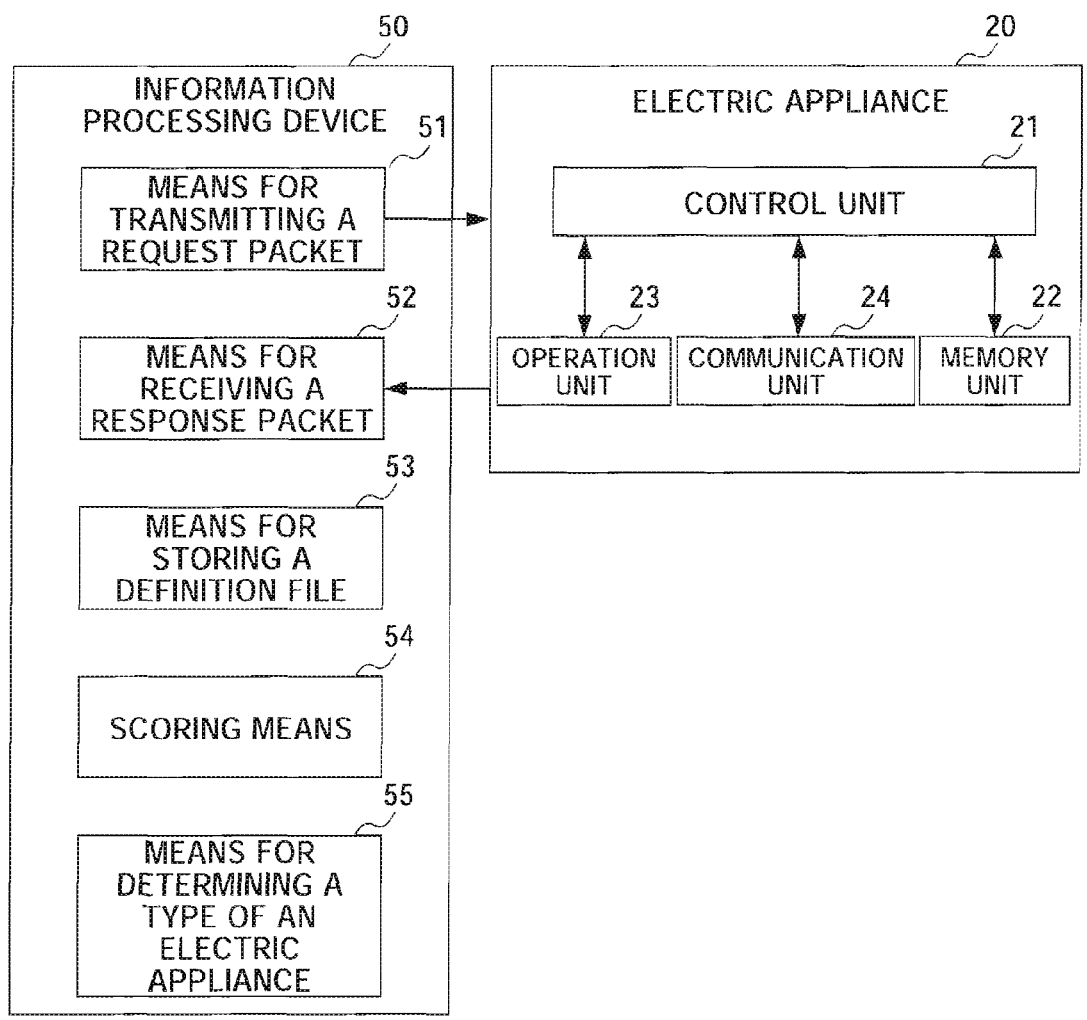
FIG. 2 is a functional block diagram of an information processing device 50 and an electric appliance 20.
Figure 11:
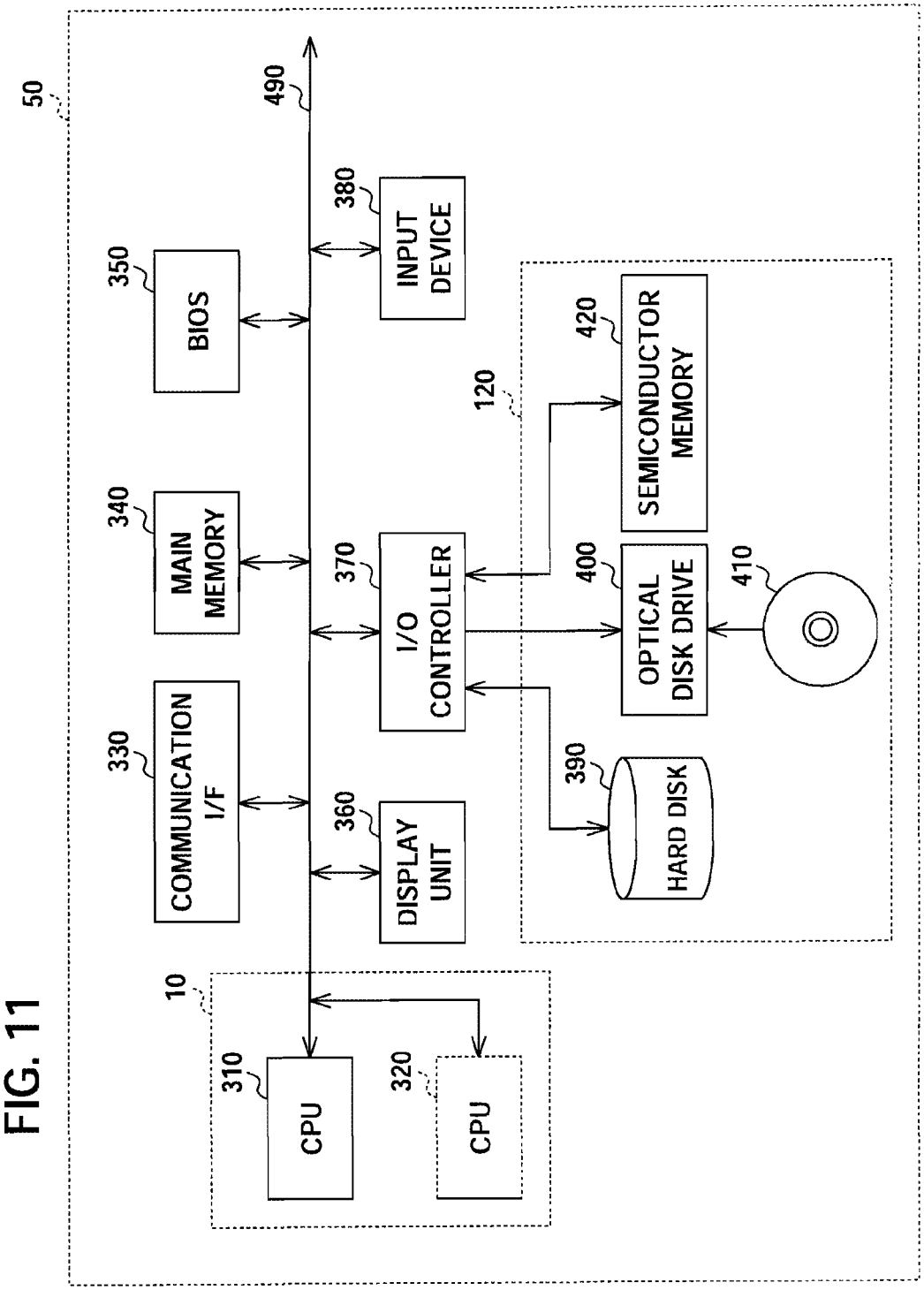
FIG. 11 is a diagram showing an example of a hardware configuration of the information processing device 50.

Embodiments of the present invention are hereinafter described with reference to the drawings. It should be noted that the following are merely examples, and the technical scope of the present invention is not limited thereto.
First Embodiment: Overall Configuration
FIG. 1 is a diagram showing an overall configuration of a network system 1.
The network system 1 is a network system such as a home network or an office network (local network), and is configured with an information processing device 50, electric appliances 20-a, 20-b and 20-c, and a network 2. The information processing device 50 is communicably connected to the electric appliances 20-a, 20-b and 20-c via the network 2 such as a wired/wireless LAN.
The electric appliances 20-a, 20-b and 20-c are provided with a network connection function, and include, for example, a recording medium video recorder/player 20-a (DVD/HD video recorder/player), telephone 20-b and computer 20-c, and in addition, refrigerator, audio device, washing machine, router, television, printer, and multi-function device. The electric appliances 20-a, 20-b and 20-c are each provided with a function to communicate with the information processing device 50 via the network 1 by way of a protocol such as TCP/IP.
Functions of Information Processing Device and Electric Appliances
FIG. 2 is a functional block diagram of the information processing device 50 and an electric appliance 20.
The information processing device 50 is provided with means 51 for transmitting a request packet, means 52 for receiving a response packet, means 53 for storing a definition file, scoring means 54, and means 55 for determining a type of an electric appliance. As illustrated in FIG. 11, the information processing device 50 is an information appliance provided with a control unit 10 and main memory 340, and may be a computer or a router. A program to implement each of the aforementioned means is read to the main memory 340, and is executed by the control unit 10, thereby implementing each means. In other words, the information processing device 50 may be a dedicated information appliance provided with the aforementioned means, or may be an information appliance having other functions such as a personal computer.
The means 51 for transmitting a request packet has a function to transmit a request packet to be described later, and is implemented by a communication I/F 330 and the control unit 10.
The means 52 for receiving a response packet has a function to receive a response packet to be described later, and is implemented by the communication I/F 330 and the control unit 10.
The means 53 for storing a definition file has a function to store a definition file to be described later, and is implemented by a hard disk 390, the main memory the 340 and the like.
The scoring means 54 has a function to score each definition file based on a definition file, and is implemented by the control unit 10, the hard disk 390, the main memory the 340 and the like.
The means 55 for determining a type of an electric appliance has a function to eventually determine a type of an electric appliance, and is implemented by the control unit 10, the hard disk 390, the main memory 340 and the like.

The electric appliance 20 is at least provided with: a control unit 21 implemented by a central processing unit; a communication unit 24 implemented by a communication I/F; and a memory unit 22 implemented by a hard disk and main memory; and the electric appliance 20 may also be provided with an operation unit 23 that is an input device such as a mouse.

Flowchart of Type Determination Processing

Figure 3:
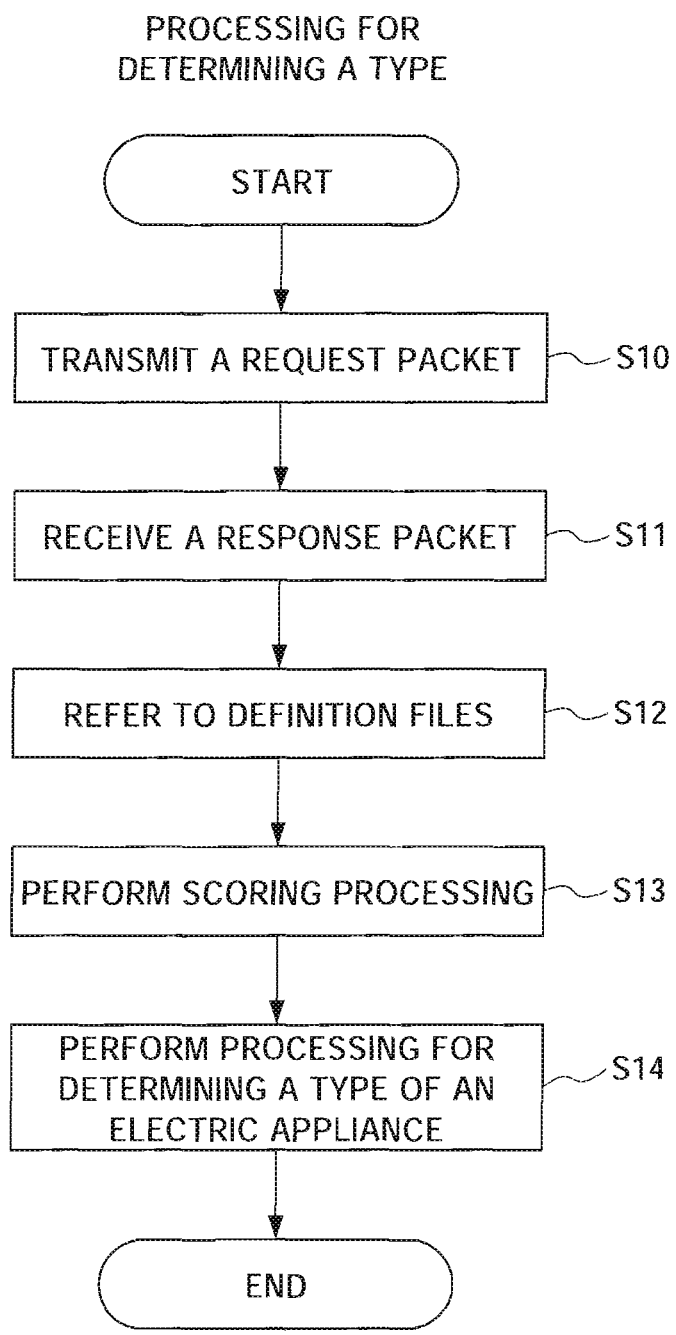
FIG. 3 is a flowchart of type determination processing.

FIG. 3 is a flowchart of type determination processing.

First, the means 51 for transmitting a request packet of the information processing device 50 transmits a request packet to the electric appliance 20 (Step S10).

The request packet is packet data that is transmitted by the information processing device 50 to the electric appliance 20 in order to receive a response packet for determining a type of the electric appliance 20.

The request packet may be, for example, a command of ARP (Address Resolution Protocol), ICMP (Internet Control Message Protocol), SNMP (Simple Network Management Protocol) and the like, and may be of a protocol conforming to uPnP (Universal Plug and Play), DLNA (Digital Living Network Alliance) and the like.

It should be noted that the means 51 for transmitting a request packet may employ an aspect in which a request packet is periodically transmitted to the electric appliance 20. In other words, the means 51 for transmitting a request packet transmits a request packet every dozens of seconds, every few minutes, or every few hours, thereby detecting a communicably connected electric appliance 20 at a predetermined timing.

That is to say, the information processing device 50 periodically transmits a request packet at a predetermined timing in order to detect a new electric appliance 20 when the new electric appliance 20 is connected to the network system 1. According to this, for a case where a new electric appliance 20 is connected by the user, the information processing device 50 can obtain information on the electric appliance 20, thereby facilitating the management of the electric appliances 20 in the network system 1.

The information related to an electric appliance is information on an electric appliance, and is information that includes at least a type of an electric appliance (a manufacturer name, a device name and the like for identifying a type of an electric appliance).

Next, the means 52 for receiving a response packet of the information processing device 50 receives a response packet from a predetermined electric appliance 20 (Step S11).

A response packet is a packet transmitted from the electric appliance 20, and is packet data for determining a type of the electric appliance 20 or serving as a clue for determining a type of the electric appliance 20. In a first embodiment, a response packet is a reply packet transmitted from the electric appliance 20 that has received a request packet transmitted from the information processing device 50. A third embodiment describes a case in which a response packet is not a reply packet to a request packet.

Next, the information processing device 50 performs definition file reference processing (Step S12). The control unit 10 of the information processing device 50 refers to definition files stored in the means 53 for storing a definition file, performs comparison thereof, and performs subsequent scoring processing (Step S13).

Figure 9:
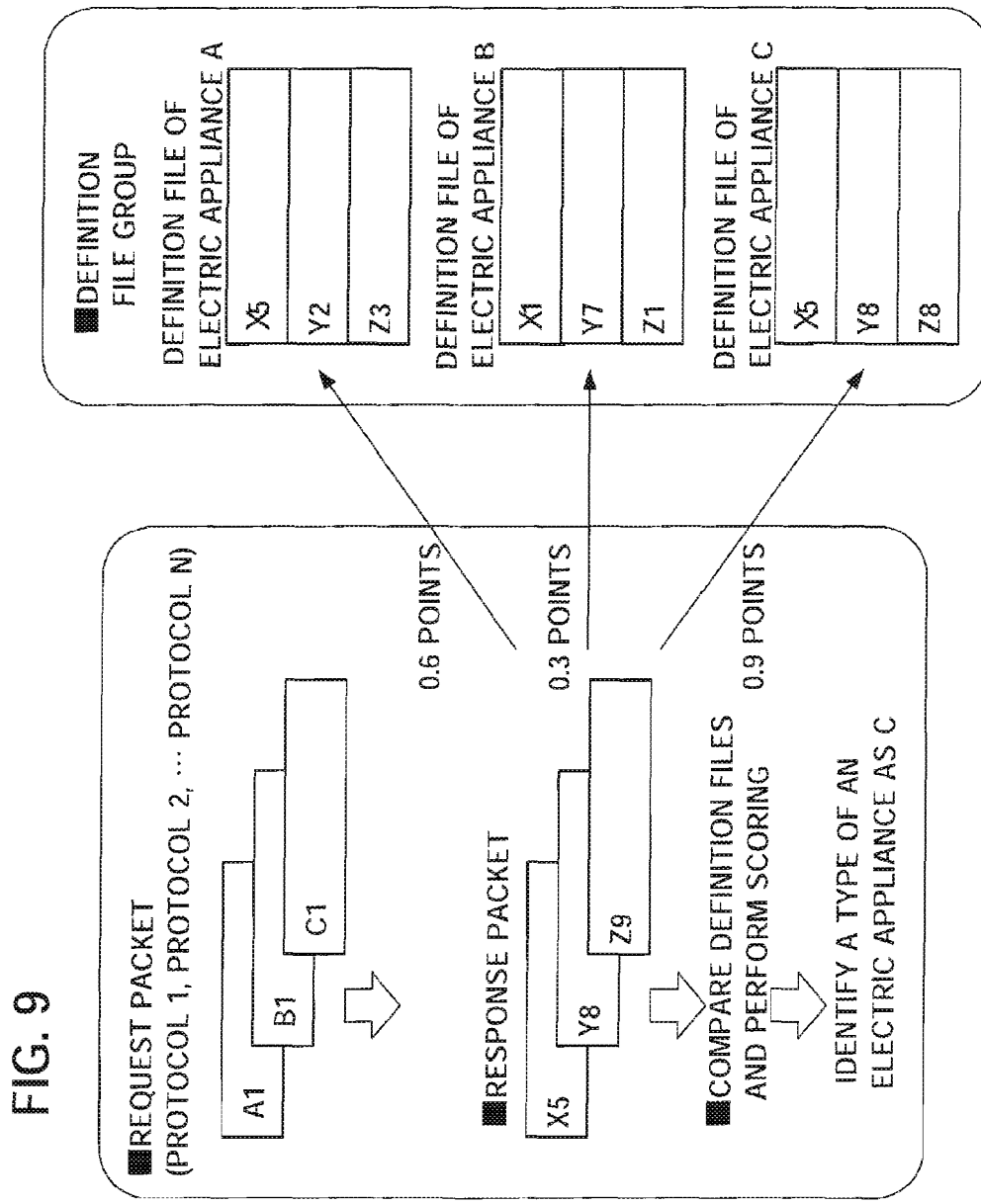
FIG. 9 is a conceptual diagram showing an example of scoring processing as well as processing for identifying an electric appliance.

A definition file is data that is predetermined for each electric appliance 20, and is data that is necessary for identifying a type of an electric appliance 20. With reference to FIG. 9 to be described later, the definition file (an electric appliance A's definition file) is composed of one or more definition items (X5, Y2, Z3), and by scoring and comparing each of the definition items, an electric appliance 20 (the electric appliance A in this case) is identified. A definition item is definition data for identifying a type of an electric appliance 20 by way of one request packet and one response packet.

Next, the scoring means 54 of the information processing device 50 compares the definition files and the response packets, and performs scoring (Step S13).

Scoring is described with reference to FIG. 9. The information processing device 50 transmits one or more request packets (A1, B1, C1), and receives response packets (X5, Y8, Z9) in response thereto. The information processing device 50 then refers to definition items of the definition files of respective electric appliances (an electric appliance A's definition file, an electric appliance B's definition file, and an electric appliance C's definition file) stored in the means 53 for storing a definition file, and compares them with the response packets.

For example, an explanation is provided for a case in which an ARP command is transmitted as a request packet, and a response to this is received from an electric appliance 20. By transmitting the ARP command to a target electric appliance 20, a packet including information of a MAC address of the target electric appliance 20 is received as a response packet.

As shown in FIG. 4, a MAC address is composed of a 48-bit code, in which the high-order 24 bits are a vendor ID to which a vendor-unique ID is assigned, and the next 8 bits are a device model ID.

The means 53 for storing a definition file may store a table for configuring a definition file for each electric appliance. For example, as shown in FIG. 5, a high-order 24-bit code, a manufacturer name of an electric appliance 20 (the manufacturer name may not necessarily be a vendor name of the manufacturer, but may be a vendor (manufacturer) name of the electric appliance 20 as a whole including a communication I/F), points for scoring, and an ID are associated as a MAC address manufacturer table. Furthermore, as shown in FIG. 6, a high-order 24-bit code, a model name of an electric appliance 20, points for scoring, and an ID are associated as a MAC address device model table.

By extracting each element of the MAC address manufacturer table and the MAC address device model table, definition items are obtained to configure a definition file for each electric appliance. For example, an ID 001 of the MAC address manufacturer table corresponds to X5 (a definition item X5) of the electric appliance A's definition file (refer to FIG. 9), and an ID 010 of the MAC address device table corresponds to Y2 (a definition item Y2) of the electric appliance A's definition file.

In response to a packet A1 transmitted as a request packet, the electric appliance 20 transmits a response packet. The response packet (X5) and the definition items of the electric appliance A's definition file are compared, and if they are identical, points are given by referring to each table.

For example, in the aforementioned example, a description is made for a case in which the response packet X5 is a packet including information of the target MAC address, and the 48-bit code is "04-A3-43-5F-43-23". Since the high-order 24 bits are identical with a definition item X5 (ID 001), 0.3 points are given. Furthermore, since the next 8 bits are also identical with a definition item (ID 010), 0.3 points are given. Therefore, the electric appliance A's definition file can obtain 0.6 points in total.

It should be noted that, in the aforementioned example, the two definition items (IDs 001 and 010) are scored for the single request packet (A1) by way of the response packet (X5); in this way, an aspect may be employed in which a plurality of definition items are scored from a single response packet.

Next, the information processing device 50 compares a response packet Y8 with Y2 of the electric appliance A's definition file, and compares a response packet Z9 with Z3 of the electric appliance A's definition file, thereby obtaining each point (refer to FIG. 9). The total score of the electric appliance A's definition file is a sum of all the points that have been obtained in this way. A total score is obtained for each of all the electric appliance's definition files such as the electric appliance A's definition file, the electric appliance B's definition file, the electric appliance C's definition file and so on.

Although the case has been described in which the response packet X5 is identical with the definition item X5 in the aforementioned description, determination may be made not only by way of identity, but also by way of similarity.

As an example of determination by way of similarity, an aspect may be employed (determination is made by way of similarity of the character strings of the packet), where 0.2 points are given for a case in which up to the high-order 16 bits of the high-order 24 bits of the response packet X5 are identical, and 0.1 points are given for a case in which up to the high-order 8 bits thereof are identical. In this way, the point values can be adjusted such that the more the definition item is similar to a response packet, the higher points are given.

By transmitting a plurality of kinds of request packets, the information processing device 50 receives a plurality of response packets from the electric appliance 20.

Next, the means 55 for determining a type of an electric appliance of the information processing device 50 determines a type of the electric appliance 20 (device) (Step S14). In other words, the scoring as described above is performed for definition files of all the electric appliances, the scores thus obtained are compared, and a definition file with a high score is extracted, thereby determining a type of the electric appliance 20.

For example, as described above, a total score is obtained for each of all the electric appliance's definition files such as the electric appliance A's definition file, the electric appliance B's definition file, the electric appliance C's definition file and so on and an electric appliance's definition file with the highest score is extracted, thereby identifying the electric appliance 20.

If describing with reference to FIG. 9, it is assumed for example that, since X5 is common to the response packets (X5, Y8, Z9) and the electric appliance A's definition file (X5, Y2, Z3), the electric appliance A's definition file obtains 0.6 points. On the other hand, it is assumed that, although none of the definition items (X1, Y7, Z1) of the electric appliance B's definition file are identical with those of the response packets (X5, Y8, Z9), the electric appliance B's definition file obtains 0.3 points by considering the similarity.

In addition, it is assumed that, since a definition item Y8 is common to the electric appliance C's definition file (X5, Y8, Z8) and the response packets (X5, Y8, Z9), the electric appliance C's definition file obtains 0.9 points. In this case, it is determined that the electric appliance C's definition file has the highest total score (0.9 points) among the electric appliances A's to C's definition files, and the definition file C is extracted; therefore, a type of the electric appliance 20 is determined to be the electric appliance C.

As an example, it is assumed that the electric appliance A's definition file is a definition file that identifies up to a manufacturer name called Company A, and the electric appliance B's definition file is a definition file that can identify up to AB-01, which is one of the device types, in addition to the manufacturer name called Company A. In this case, in a case in which a certain electric appliance 20 is manufactured by Company A, and a type thereof is AB-01, the points of the electric appliance B's definition file are higher than the points of the electric appliance A's definition file. Therefore, it is determined that the electric appliance 20 is the electric appliance B (AB-01 of Company A) with a high total score.

Conversely, in a case in which a certain electric appliance 20 is manufactured by Company A, and a type thereof is BC-03, it is possible to identify up to a manufacturer that is Company A, by way of the electric appliance A's definition file or the electric appliance B's definition file. Therefore, although a device name can not be identified, it is possible to identify at least up to a manufacturer name and to identify the information on an electric appliance in a step-wise manner.

As a determination element for the scoring other than a MAC address, an example of determination by way of a TCP/IP port is described with reference to FIGS. 7 and 8. A type of an electric appliance 20 is identified by way of an operating condition of a well-known port of the electric appliance 20, a port number to be specially used (bound) by the electric appliance 20.

As shown in FIG. 7, it is assumed that an electric appliance X is currently using port numbers 5000 and 5002, and not using a port number 5001. For example, this status is detected by way of a NETSTAT command. In addition, as shown in FIG. 8, a port number table stored in the means 53 for storing a definition file is referred to, port numbers currently being used (being bound) are compared, and determination is made for identity with definition items of an ID 100, thereby giving points. In a case in which the port numbers 5000 and 5002 are currently being used, and the port number 5001 is not being used, 0.2 points are given.

In a case in which a NETSTAT command is used, the NETSTAT command may transmit a packet as a request packet to a target electric appliance 20; however, as will be described in a third embodiment, since the information processing device 50 receives a broadcast or multicast packet from the electric appliance 20 in advance, a NETSTAT command result may be obtained by utilizing such received packets.

In other words, even if the information processing device 50 does not transmit a NETSTAT command as a request packet to the electric appliance 20, the scoring processing as described above may be performed based on a broadcast or multicast packet (a packet or the like for making a notification of a binding status of a port number) that is transmitted from the electric appliance 20.

It should be noted that points are not only given for a case in which the binding status is completely identical to that of the port numbers in the port number table, but may also be given in accordance with a usage degree (a degree to which the usage degree is not completely identical but similar) by determining what percent of the existing ports are currently being used and what percent of the existing ports are not currently being used. For example, it is assumed that a usage degree of a port and points thereof are associated and stored as a table in advance. In this case, when the port numbers 5000 and 5002 are currently being used, and the port number 5001 is not currently being used, 66% of the ports are currently being used. Therefore, in this processing, in a case in which 66% of the ports are currently being used, the table is referred to, and predetermined points are given.

Furthermore, points may be given by confirming a version of an OS (Operating System). For example, as will be described in the third embodiment, an nbns (Net BIOS Name Server) packet is received as a response packet transmitted to broadcast, version information of an OS is obtained, the OS is identified based on this, and points may be given based on the identified version of the OS.

For example, it is assumed that a definition item defining that "0.5 points are added for a case in which 'type X' is used as an OS version" is registered in an electric appliance AB-01's definition file. In this aspect, if the OS version is identified as "type X" by way of an nbns packet, 0.5 points are added to the electric appliance AB-01.

Conceptual Diagram of Screen

Figure 10:
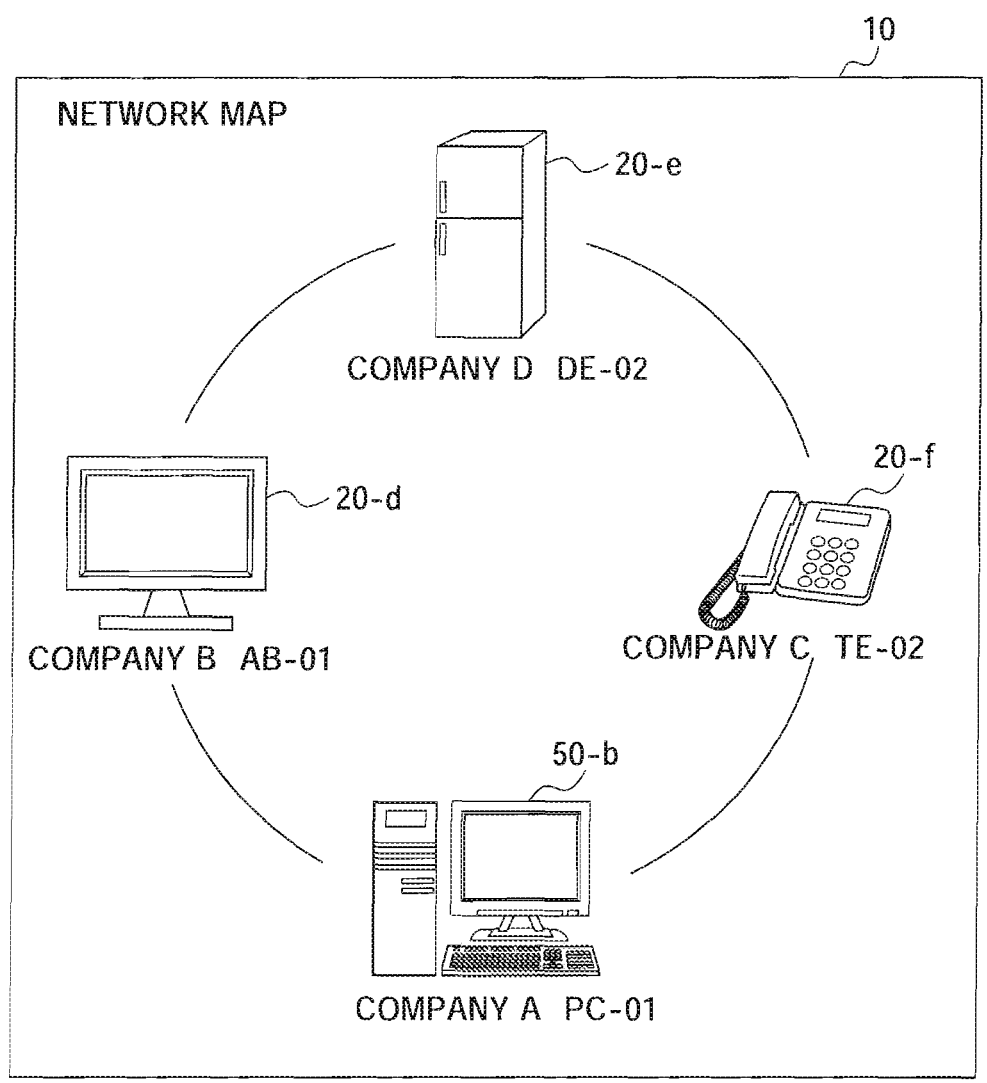
FIG. 10 is a diagram showing an example of a screen image displayed on a display unit 360.

FIG. 10 is a conceptual diagram of a screen in which the information processing device 50 has a display unit 360, on which the information on an electric appliance (a manufacturer name and a device name) of the electric appliances 20-*b*, 20-*d*, 20-*e* and 20-*f* that are connected to the network system 1 is displayed with icons. The information on an electric appliance may be displayed in a real-time manner on this screen when the information on an electric appliance is identified.

It should be noted that, when an electric appliance 20 is identified, information of the electric appliance 20 may be displayed. In other words, as the information on an electric appliance, in addition to a manufacturer name and a device name, a manufacture's Web site of the electric appliance, which is stored in advance by being associated with the information processing device 50, may be displayed in the vicinity of the manufacturer name and the device name.

Hardware Configuration Diagram

FIG. 11 is a diagram showing a hardware configuration of the information processing device 50. A server for implementing the present invention may be a standard one, and a configuration example thereof is hereinafter described.

The information processing device 50 is provided with a CPU 310 configuring the control unit 10 (a plurality of CPUs such as a CPU 320 may be added in a case of a multiprocessor configuration), a bus line 490, a communication I/F (I/F: interface) 330, main memory 340, a BIOS (Basic Input Output System) 350, a display unit 360, an I/O controller 370, an input device 380 such as a keyboard and a mouse, a hard disk 390, an optical disk drive 400, and semiconductor memory 420. It should be noted that the hard disk 390, the optical disk drive 400 and the semiconductor memory 420 are collectively referred to as a memory unit 120.

The control unit 10 is a portion for performing overall control of the information processing device 50, collaborates with the aforementioned hardware by appropriately reading and executing a variety of programs stored in the hard disk 390, and implements a variety of functions according to the present invention.

The communication I/F 330 is a network adapter for the information processing device 50 to transmit and receive information and data with the electric appliances 20 via the aforementioned network 1. The communication I/F 330 may include a modem, cable modem and Ethernet (registered trademark) adapter.

The BIOS 350 records programs to be executed by the CPU 310 when activating the information processing device 50, programs dependent on the hardware of the information processing device 50, and the like.

The display unit 360 includes display units such as a cathode ray tube display unit (CRT) and a liquid crystal display unit (LCD).

The hard disk 390, the optical disk drive 400 and the memory unit 120, which is a storage device such as the semiconductor memory 420, can be connected to the I/O controller 370.

The input device 380 also accepts an input by a manager of the information processing device 50.

The hard disk 390 stores a variety of programs for causing this hardware to function as the information processing device 50, a variety of programs for executing the functions of the present invention, and tables and records to be described later. It should be noted that the information processing device 50 can also utilize a hard disk (not shown) that is provided externally and separately as an external storage device.

As the optical disk drive 400, for example, a DVD-ROM drive, CD-ROM drive, DVD-RAM drive and CD-RAM drive can be used. In this case, an optical disk 410 corresponding to each drive is used. Programs or data can be read from the optical disk 410 by the optical disk drive 400, and be provided to the main memory 340 or the hard disk 390 via the I/O controller 370.

It should be noted that the computer in the present invention refers to an information processing device provided with a storage device, a control unit and the like; the information processing device 50 is configured with an information processing device provided with the control unit 10, the memory unit 120 and the like; and this information processing device is included in the concept of the computer of the present invention.

Second Embodiment: Device Recognition Server

Although an embodiment in which the information processing device 50 determines a type of an electric appliance 20 has been described in the above first embodiment, it is not limited thereto, and an aspect is hereinafter described as a second embodiment in which a type of an electric appliance 20 is determined by a device recognition server 500 connected thereto via a public network.

Figure 12:
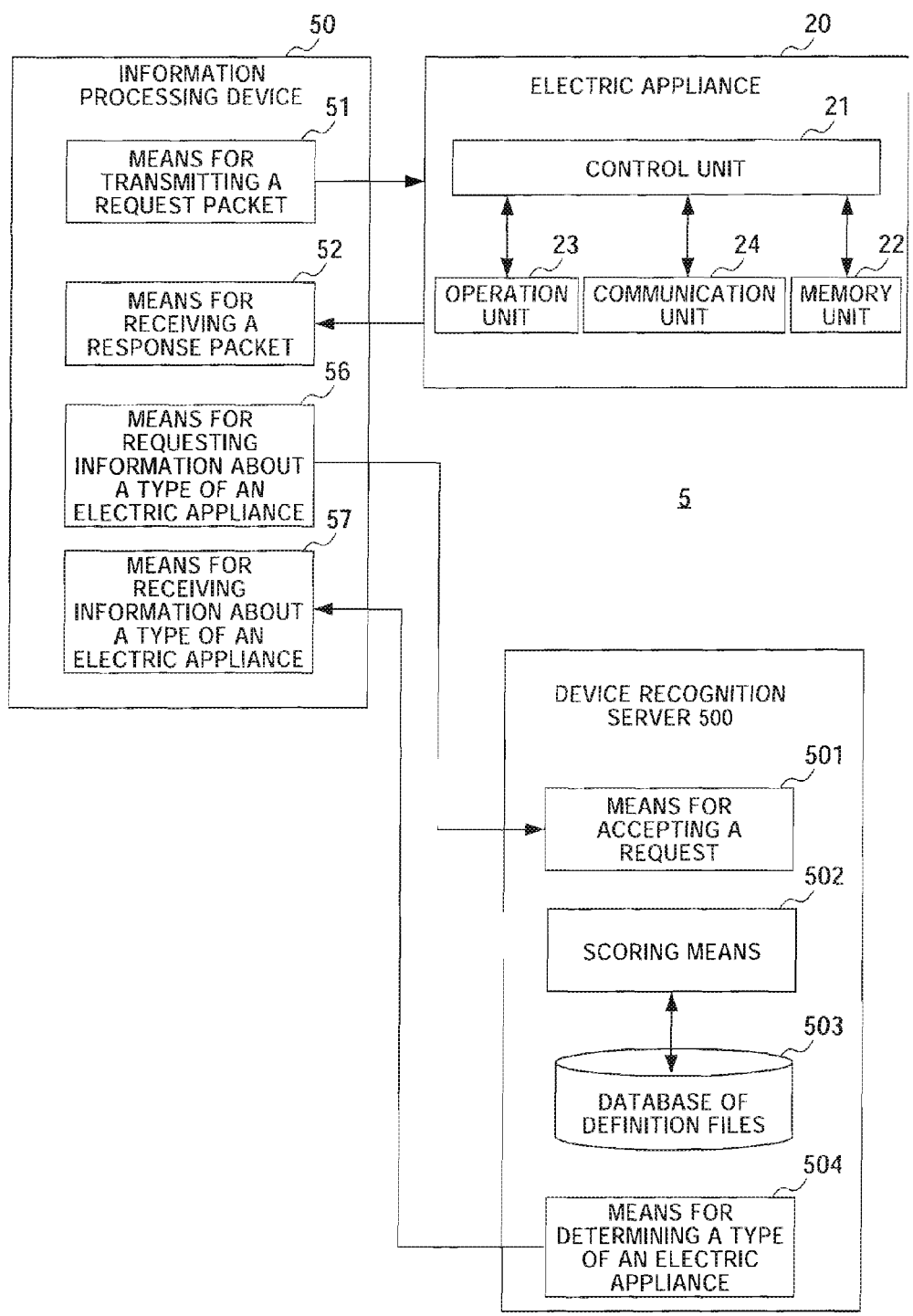
FIG. 12 is a diagram showing an example of an system 5 for determining a type of an electric appliance according to a second embodiment.

As shown in FIG. 12, a system 5 for determining a type of an electric appliance is configured with an information processing device 50, electric appliance 20, and device recognition server 500. In a preferred embodiment, the electric appliance 20 and the information processing device 50 are communicably connected via a local network (home network), and the device recognition server 500 is communicably connected thereto via a public network (the Internet and the like).

The information processing device 50 is provided with means 51 for transmitting a request packet, means 52 for receiving a response packet, means 56 for requesting information about a type of an electric appliance, and means 57 for receiving information about a type of an electric appliance. The hardware configuration of the information processing device 50 is similar to that in the first embodiment. The information processing device 50 can be operated on a device on which, for example, JAVA (registered trademark) VM (JAVA (registered trademark) Virtual Machine) and an OSGi (Open Services Gateway Initiative) framework are operated.

The means 51 for transmitting a request packet has a function to transmit a request packet to an electric appliance 20, and is implemented by the communication I/F 330 (refer to FIG. 11) and the control unit 10.

The means 52 for receiving a response packet has a function to receive a response packet from an electric appliance 20, and is implemented by the communication I/F 330 and the control unit 10.

The means 56 for requesting information about a type of an electric appliance has a function to request information for identifying a type of an electric appliance (the information on an electric appliance) to the device recognition server 500, and is implemented by the communication I/F 330 and the control unit 10. More specifically, the information processing device 50 transmits, to the device recognition server 500, a request packet that has been transmitted to an electric appliance 20, and a response packet that is responding from the electric appliance 20, thereby requesting electric appliance information.

The means 57 for receiving information about a type of an electric appliance has a function to receive information for identifying a type of an electric appliance (the information on an electric appliance) that has been identified by the device recognition server 500, and is implemented by the communication I/F 330 and the control unit 10.

The device recognition server 500 is provided with means 501 for accepting a request for accepting a request from the information processing device 50, scoring means 502, a definition file database 503, and means 504 for determining a type of an electric appliance. The device recognition server 500 is a computer, and a basic hardware configuration thereof may be identical to that of the information processing device 50.

The means 501 for accepting a request has a function to accept a request of the information on an electric appliance from the information processing device 50, and is implemented by the control unit and the communication I/F. More specifically, a request packet that has been transmitted from the information processing device 50 to an electric appliance 20, and a response packet that has been responded to by the electric appliance 20 are received from the information processing device 50, thereby prompting the scoring means 502 to perform processing.

The scoring means 502 has a function to score each definition file, and is implemented by the control unit and a hard disk. This function is similar to that in the first embodiment.

The definition file database (definition file storing means) 503 has a database function to store a definition file to be described later, and is implemented by the control unit and the hard disk. Although this function is similar to that of the means for storing a definition file in the first embodiment, since the definition file database 503 is a dedicated server, it is possible to increase the data amount of definition files that can be processed, as compared to the case being managed by the information processing device 50. It should be noted that SQL may be used as a database language.

The means 55 for determining a type of an electric appliance has a function to eventually determine a type of an electric appliance and to send it to the information processing device 50, and is implemented by the control unit and the hard disk. This function is similar to that in the first embodiment, except for the function to transmit the information on an electric appliance, i.e. information on an eventually determined type of an electric appliance, to the information processing device 50.

The functional configuration of the electric appliance 20 is similar to that in the first embodiment.

The system 5 for determining a type of an electric appliance, which is configured with: the information processing device 50 that is communicably connected to the electric appliances 20; and the device recognition server 500 that is communicably connected to the information processing device 50, performs the following.

The information processing device 50 performs: a request packet transmitting step to transmit a predetermined request packet to an electric appliance 20; a response packet receiving step to receive a response packet for determining a type of the electric appliance 20 from the electric appliance 20 to which the request packet has been transmitted; and a type information requesting step to request information on a type of the electric appliance 20 by transmitting the response packet to the device recognition server 500.

In response to this, the device recognition server 500 performs: a storing step to store a definition file defined for each electric appliance 20; a scoring step to compare the response packet and definition files for each electric appliance 20 to provide scoring in response to the request from the information processing device 50; and an electric appliance type determining step to extract a definition file with a high score by way of the scoring step, to determine the information on a particular electric appliance of the extracted definition file as corresponding to the electric appliance 20, and to transmit the information on the particular electric appliance to the information processing device 50.

Therefore, according to the aforementioned invention, it is possible to automatically identify a type of a communicably connected electric appliance (a device name or the like for identifying a type of the electric appliance) without involving the user; and furthermore, since the device recognition server 500 determines the information on an electric appliance, even if a definition file is newly updated, only the definition file database 503 of the device recognition server 500 should be updated, and it is not necessary to update the definition files of the information processing device 50.

In other words, since at least one information processing device 50 is placed in a house and a company of the user, it may not be efficient to update the definition files of these individual information processing devices 50 in some cases. In contrast, the updating can be performed only by updating the definition file database 503 of the device recognition server 500, a result of which makes it possible to achieve centralization of the information management for determining a type of an electric appliance 20. Since the definition files are updated every time the number of types of the electric appliances 20 increases (every time a new electric appliance 20 is released), such centralization significantly increases the convenience.

Management of Electric Appliance Information with Device Recognition Server

It should be noted that, after a type of an electric appliance 20 is determined, the device recognition server 500 may store and manage the type of the electric appliance 20 for each of the information processing devices 50.

In the device recognition server 500, a home network management table as shown in FIG. 13 is stored in a database of the device recognition server 500, and the information on an electric appliance obtained from the information processing device 50 is stored and managed for each home network. A home network ID is a single ID managed for each home network, and one information processing device 50 may be assigned with a single home network ID corresponding thereto.

In an example of FIG. 13, AB-01, DE-02 and PC-01 are detected as electric appliances 20 for a home network ID 500, and are registered with the device recognition server 500. In this way, by storing electric appliances for each home network in the device recognition server 500, the device recognition server 500 is capable of managing the electric appliances 20 for each home network.

Third Embodiment: Embodiment of Passive Packet

A third embodiment is an embodiment in which the type determination processing (Steps S11 to S14) is performed without the information processing device 50 transmitting a request packet to an electric appliance 20 (the information processing device 50 is not provided with the means 51 for transmitting a request packet).

In other words, a broadcast packet and a multicast packet (passive packets) transmitted by an electric appliance 20 to the information processing device 50 at a predetermined timing are processed as (response) packets.

When determining a type of an electric appliance 20, the information processing device 50 does not transmit a request packet to the electric appliance 20, but receives a broadcast packet or a multicast packet from the electric appliance 20, and based on such a packet, refers to a definition file, performs scoring processing, and determines a type of the electric appliance 20 (Steps S12 to S14 of the type determination processing in FIG. 3).

A broadcast packet is a data packet to be transmitted to all the terminals on the network at the same time. A multicast packet is a data packet to be transmitted to, not all the terminals as in the case of the broadcast packet, but to a plurality of predetermined terminals on the network at the same time.

For example, an nbns packet that is a passive packet is received to obtain version information of the OS, the OS is identified based on this, and points may be given based on the identified version of the OS. For example, it is assumed that a definition item defining that "0.5 points are added if 'type X' is used for an OS version" is registered in an electric appliance AB-01's definition file. In this aspect, if the OS version is identified as the "type X" by way of the nbns packet, 0.5 points are added to the electric appliance AS-01.

It should be noted that the information processing device 50 may receive a plurality of kinds of broadcast or multicast packets, and identify the electric appliance 20 based on a total score obtained by individual scoring.

The information processing device 50 may identify a type of the electric appliance 20 by combining a result of performing scoring processing by transmitting a request packet and receiving a response packet in response thereto, and a result of performing scoring processing by receiving a broadcast or a multicast packet.

Also in a case in which the device recognition server 500 determines a type of an electric appliance 20, the information processing device 50 does not transmit a request packet to the electric appliance 20, but receives a broadcast packet or a multicast packet from the electric appliance 20, and based on such a packet, the device recognition server 500 may perform scoring processing, and may determine a type of the electric appliance 20.

Auxiliary Input from User

According to the aforementioned embodiment, the information processing device 50 or the device recognition server 500 determines a type of an electric appliance 20; however, by accepting an auxiliary data input from a user, a type may be determined based on such data. For example, in a case in which the user recognizes data on an electric appliance 20 (for example, a manufacturer name), the information processing device 50 or the device recognition server 500 accepts the data on the electric appliance 20 from the user, and determines a type of the electric appliance 20 based on the data and a result of scoring. In other words, for example, the information processing device 50 or the device recognition server 500 determines a manufacturer name by way of the input data from the user before scoring, refers to only a definition file about the determined manufacturer name, and determines a type without referring to definition files including the other manufacturer names.

Here, the input of a manufacturer name may be a text input by the user to the electric appliance 20, the information processing device 50 or the device recognition server 500; or character recognition is performed from an image captured by way of a digital camera, a manufacturer name is extracted from the characters, and the data of the manufacturer name may be utilized. In other words, by accepting the input of the image captured by way of a digital camera, the information processing device 50 or the device recognition server 500 performs character recognition of this image, and extracts the information on the electric appliance 20 as text characters. These extracted text characters are used as input data.

Here, there may be a case in which step-wise determination is possible instead of final determination, such that determination is possible up to a manufacturer name of an electric appliance 20, but determination is not possible up to a model name of the electric appliance 20. In order to address such a situation, a wizard for asking the user in a question format may be displayed such as, for example, "the manufacturer name is identified as . . . , but the model name is unknown; please input a model name." In other words, in a case in which determination is possible up to a manufacturer name, but a model name can not be determined, a configuration is employed in which this question message is displayed. Here, the content to be asked is not limited to a model name, and a type of an electric appliance 20 (a digital television or a recording medium player/recorder) may be asked, or a size, a color and a shape of a supposed electric appliance 20 may be asked. In this case, an electric appliance 20 is associated with a size, a color, a shape and the like thereof and stored in advance, and a response thereto is obtained, thereby enabling identification of a model name and the like. When asking a question, a plurality of icons (images) of electric appliances 20 may be displayed as candidates for determination, and selection of an icon from the user may be accepted.

Moreover, the input data is not limited to a manufacturer name as described above, and may be a product name, a logo mark, a house mark, a type name and the like. In this case, it is based on the assumption that the product name, the logo mark, the house mark, the type name and the like thus used configure definition items, and are stored as a definition file in advance. Conversely, data that is input by the user may be stored as definition items, and may be used for updating a database such as definition files.

As a result, in this way, by receiving the auxiliary information of an electric appliance 20 from the user, the processing time for determining a type can be shortened, and accurate determination of a type can be made.

Packet Capture of HTTP

In a case in which the information processing device 50 is a router, when an electric appliance 20 connects with an external network such as a public network (the Internet), such access is performed via the information processing device 50.

Therefore, a type of an electric appliance 20 may be determined by the information processing device 50 that obtains (captures) and analyzes a request packet transmitted from the electric appliance 20 to the external network. In other words, when the electric appliance 20 performs communication as a client terminal by transmitting HTTP (Hyper Text Transfer Protocol) request packets, a part or all of the packets including the initial request packet up to a packet for terminating the communication may be utilized for determining a type of the electric appliance 20.

For example, in a case in which the electric appliance 20 is a digital television, the contents that can be browsed or played may be different depending on the type of the digital television in some cases. This is a case in which, for example, although a digital television A has a Web page browsing function, video playing function, and rental video playing function, a digital television B has only the Web page browsing function. Therefore, in a case in which the electric appliance 20 has transmitted a playing request packet for the video playing function, and the information processing device 50 has captured this packet, it is determined that the electric appliance 20 is not the digital television B, but the digital television A. In this way, a type of an electric appliance 20 may be determined in accordance with a difference of playable contents, and with a type of a request packet.

Regarding Other Information Serving as Clues to Type Determination

When determining a type of an electric appliance 20, a type of the electric appliance 20 can be determined by classifying a type of a DHCP (Dynamic Host Configuration Protocol) client. Information on whether the electric appliance 20 conforms to IPv6 (Internet Protocol Version 6) can also be utilized. Communication among the electric appliances 20 in the network may be established by using a manufacturer-unique protocol in some cases. For example, when an NAS (Network Attached Storage) and a personal computer are connected to a network (such as LAN), the personal computer may transmit a manufacturer-unique packet for detecting and connecting with the NAS in some cases. In this case, the information processing device 50 may obtain the manufacturer-unique packet to determine a type. A type of an electric appliance 20 may be determined based on a power consumption waveform that is formed as a graph of power consumption of each electric appliance 20 in chronological order. In other words, since a power consumption waveform is different depending on a type of the electric appliance 20, by storing a power consumption waveform for each electric appliance 20 in advance, the electric appliance 20 may be identified by comparing a waveform thereof with the stored waveforms. The aforementioned means and functions are implemented by a computer (containing a CPU, an information processing device, and various terminals) that reads and executes predetermined application programs. The application programs are provided, for example, in a form of being recorded in a computer readable recording medium such as a flexible disk, CD (CD-ROM) and DVD (DVD-ROM, DVD-RAM). In this case, the computer reads an application program from the recording medium, transfers and stores the application program in an internal storage device or an external storage device, and executes the application program. Moreover, the program may be, for example, recorded in a storage device (recording medium) such as a magnetic disc, optical disk or magneto-optical disk in advance, and may be provided to the computer via a communication line from the storage device.

Furthermore, a part or all of the application programs may be provided by a server via a public line network, and the aforementioned method may be provided as a service of an SaaS (Software as a Service) type. In other words, in this case, a part of the programs for executing the aforementioned processing is transmitted from the server, executed on the terminal side, and implemented in collaboration with the programs on the server side.

Although embodiments of the present invention have been described above, the present invention is not limited to these embodiments. In addition, the effects described in the embodiments of the present invention merely illustrate the most preferable effects resulting from the present invention, and the effects according to the present invention are not limited to those described in the embodiments of the present invention.

What is claimed is:

1. An information processing device to which an electric appliance is communicably connected, comprising:
   means for receiving a data packet that receives the data packet from an electric appliance, the received data packet including at least one passive packet containing information for determining a type of the electric appliance;
   means for storing a definition file that stores a definition file corresponding to each of a plurality of types of electric appliances, wherein each definition file includes defining data based on an expected Operating System version associated with each corresponding type of electric appliance and that also stores a score associated with the expected Operating System version for each definition file;
   means for scoring that compares a version of an Operating System identified from the at least one passive packet contained in the received data packet with the expected Operating System version contained in each definition file, identifies each definition file for which the expected Operating System version is identical to the version contained in the received data packet, and adds the stored score associated therewith to a total score corresponding to each of the plurality of types of electric appliances so as to perform scoring for each definition file based on the stored scores; and
   means for determining a type of an electric appliance that extracts a stored definition file corresponding to a highest one of the total score provided by the means for scoring and determines from the defining data of the extracted definition file the type of the electric appliance from which the means for receiving received the data packet.

2. The information processing device according to claim 1, wherein the at least one passive packet includes a NetBios name server packet.

3. The information processing device according to claim 1, wherein the means for scoring compares the received data packet with each definition file and performs scoring according to an amount of similarity between the received data packet and each definition file.

4. The information processing device according to claim 1, further comprising a means for transmitting a request packet to the electric appliance, wherein the means for transmitting a request packet transmits the request packet to the electric appliance at regular intervals so as to detect the electric appliance communicably connected to the information processing device at a predetermined interval.

5. A computer-implemented method for controlling an information processing device to which electric appliances are communicably connected, the information processing device having a processor associated therewith, the method comprising the steps of:
   receiving a data packet for processing by the information processing device from an electric appliance, the received data packet including at least one passive packet containing information for determining a type of the electric appliance;
   storing a definition file corresponding to each of a plurality of types of electric appliances for access by the information processing unit, wherein each definition file includes defining data based on an expected Operating System version associated with each corresponding type of electric appliance, and storing a score associated with the expected Operating System version for each definition file;
   scoring by comparing a version of an Operating System identified from the at least one passive packet contained in the received data packet with the expected Operating System version contained in each definition file, identifying each definition file for which the expected Operating System version is identical to the version contained in the received data packet, and adding the stored score associated therewith to a total score corresponding to each of the plurality of types of electric appliances so as to perform scoring for each definition file based on the stored scores, wherein the scoring is implemented by the processor associated with the information processing unit;

extracting a definition file corresponding to a highest one of the total score provided at the step of scoring; and determining from the defining data of the extracted definition file the type of the electric appliance from which the data packet is received in the receiving step, wherein the extracting and determining are implemented by the processor associated with the information processing unit.

6. The method according to claim 5, wherein the receiving a data packet includes receiving a plurality of data packets including the at least two kinds of packets, and the determining a type of an electric appliance extracts a stored definition file having the highest score based on a sum total of each score associated with the at least two kinds of data packets.

7. The method according to claim 5, wherein the scoring compares the received data packet with each definition file and performs scoring according to an amount of similarity between the received data packet and each definition file.

8. The method according to claim 5, further comprising transmitting a request packet to the electric appliance, wherein the transmitting a request packet transmits the request packet to the electric appliance at regular intervals so as to detect the electric appliance communicably connected to the information processing device at a predetermined interval.

9. A system for determining a type of an electric appliance comprising:

an information processing device to which electric appliances are communicably connected; and a unit recognition server communicably connected with the information processing device, the information processing device comprising:

means for receiving a data packet from an electric appliance from which a type of the electric appliance is determined, the received data packet including at least one passive packet containing information for determining the type of the electric appliance; and means for requesting a determination of the type of the electric appliance by transmitting the received data packet to the unit recognition server, the unit recognition server comprising:

means for storing a definition file that stores a definition file corresponding to each of a plurality of types of electric appliances, wherein each definition file includes defining data based on an expected Operating System version associated with each corresponding type of electric appliance and the means for storing also storing a score associated with the expected Operating System version for each definition file;

means for scoring that compares a version of an Operating System identified from the at least one passive packet contained in the received data packet with the expected Operating System version contained in each definition file, identifies each definition file for which the expected Operating System version is identical to the version contained in the received data packet, and adds the stored score associated therewith to a total score corresponding to each of the plurality of types of electric appliances so as to perform scoring for each definition file based on the stored scores in response to a request from the information processing device; and means for determining a type of an electric appliance that extracts a stored definition file corresponding to a highest one of the total score provided by the means for scoring and determines from the defining data of the extracted definition file the type of the electric appliance from which the means for receiving received the data packet and transmits the determination of the type of the electric appliance to the information processing device.

10. A unit recognition server communicably connected with an information processing device to which electric appliances are communicably connected, comprising:

means for receiving a data packet that receives from the information processing device a data packet that is transmitted by an electric appliance from which a type of the electric appliance is determined, the received data packet including at least one passive packet containing information for determining the type of the electric appliance;

means for storing a definition file that stores a definition file corresponding to each of a plurality of types of electric appliances, wherein each definition file includes defining data based on an expected Operating System version associated with each corresponding type of electric appliance and that also stores a score associated with the expected Operating System version for each definition file;

means for scoring that compares a version of an Operating System identified from the at least one passive packet contained in the received data packet with the expected Operating System version contained in each definition file, identifies each definition file for which the expected Operating System version is identical to the version contained in the received data packet, and adds the stored score associated therewith to a total score corresponding to each of the plurality of types of electric appliances and performs scoring for each definition file based on the stored scores in response to a request from the information processing device; and means for determining a type of an electric appliance that extracts a stored definition file corresponding to a highest one of the total score provided by the means for scoring and determines from the defining data of the extracted definition file the type of the electric appliance from which the data packet was transmitted to the means for receiving and transmits the defining data for the type of the electric appliance to the information processing device.

11. A computer-implemented method for controlling a system comprising an information processing device to which electric appliances are communicably connected and a unit recognition server communicably connected with the information processing device and having a processor associated therewith, the method comprising the steps of:

receiving from an electric appliance a data packet for processing by the information processing device, the received data packet including at least one passive packet containing information for determining a type of the electric appliance;

requesting a determination of the type of the electric appliance by transmitting the received data packet from the information processing device to the unit recognition server;

storing a definition file corresponding to each of a plurality of types of electric appliances for access by the unit recognition server, wherein each definition file contains defining data based on an expected Operating System version associated with each corresponding type of electric appliance, and storing a score associated with the expected Operating System version for each definition file;

scoring by comparing a version of an Operating System identified from the at least one passive packet contained in the received data packet with the expected Operating System version contained in each definition file, identifying each definition file for which the expected Operating System version is identical to the version contained in the received data packet, and adding the stored score associated therewith to a total score corresponding to each of the plurality of types of electric appliances so as to perform scoring for each definition file based on the stored scores in response to a request from the information processing device, wherein the scoring is implemented by the processor; and extracting a stored definition file corresponding to a highest one of the total score provided at the step of scoring and determining from the defining data of the extracted definition file the type of the electric appliance from which the received data packet is received and transmitting the determination of the type of the electric appliance from the unit recognition server to the information processing device, wherein the extracting and determining are implemented by the processor.

12. An information processing device to which electric appliances are communicably connected, comprising:

means for receiving a data packet that receives a data packet from an electric appliance, wherein the data packet is a broadcast packet or multicast packet, the received data packet containing information for determining a type of the electric appliance;

means for storing a definition file that stores a definition file corresponding to each of a plurality of types of electric appliances, wherein each definition file includes defining data based on an expected Operating System version associated with each corresponding type of electric appliance and that also stores a score associated with the expected Operating System version for each definition file;

means for scoring that compares a version of an Operating System identified from the at least one passive packet contained in the received data packet with the expected Operating System contained in each definition file, identifies each definition file for which the expected Operating System version is identical to the version contained in the received data packet, and adds the stored score associated therewith to a total score corresponding to each of the plurality of types of electric appliances and performs scoring for each definition file based on the stored scores; and means for determining a type of an electric appliance that extracts a stored definition file corresponding to a highest one of the total score provided by the means for scoring and determines from the defining data of the extracted definition file the type of the electric appliance from which the means for receiving received the data packet.

13. The computer-implemented method according to claim 5, wherein the data packet received in the receiving a data packet step is a broadcast packet or multicast packet.

14. The unit recognition server according to claim 10, wherein the means for receiving a data packet includes a means for a broadcast packet or multicast packet, and the received data packet containing information for determining the type of the electric appliance is the broadcast packet or multicast packet.

* * * * *